United States Patent
Zhang et al.

(10) Patent No.: US 10,297,010 B2
(45) Date of Patent: May 21, 2019

(54) METHOD AND SYSTEM FOR REDUCING GRID LINE ARTIFACTS IN X-RAY IMAGE

(71) Applicant: General Electric Company, Schenectady, NY (US)

(72) Inventors: Zhaoxia Zhang, ShangHai (CN); Kun Tao, ShangHai (CN); Hao Lai, Niskayuna, NY (US); Ming Yan, Pewaukee, WI (US); Han Kang, BeiJing (CN)

(73) Assignee: GENERAL ELECTRIC COMPANY, Schenectady, NY (US)

( * ) Notice: Subject to any disclaimer, the term of this patent is extended or adjusted under 35 U.S.C. 154(b) by 0 days.

(21) Appl. No.: 15/459,701

(22) Filed: Mar. 15, 2017

(65) Prior Publication Data

US 2017/0270640 A1 Sep. 21, 2017

(30) Foreign Application Priority Data

Mar. 17, 2016 (CN) .......................... 2016 1 0153082

(51) Int. Cl.
*G06T 5/00* (2006.01)
*G06T 5/20* (2006.01)
(Continued)

(52) U.S. Cl.
CPC ............ *G06T 5/001* (2013.01); *G06K 9/6212* (2013.01); *G06T 5/10* (2013.01); *G06T 5/20* (2013.01);
(Continued)

(58) Field of Classification Search
CPC . G06T 5/001; G06T 11/60; G06T 5/20; G06T 7/13; G06T 2207/20224;
(Continued)

(56) References Cited

U.S. PATENT DOCUMENTS 5,825,846 A * 10/1998 Aach ..................... G06T 5/20
378/98
6,333,990 B1 * 12/2001 Yazici ..................... G06T 5/10
382/132
(Continued)

FOREIGN PATENT DOCUMENTS

CN 104077743 A 10/2014
CN 107274350 A 10/2017
(Continued)

OTHER PUBLICATIONS

Cui, X-Y., et al. "Learning-Based Artifact Removal via Image Decomposition for Low-Dose CT Image Processing," IEEE Transactions on Nuclear Science, vol. 63, Issue 3, pp. 1860-1873, (Jun. 2016).
(Continued)

*Primary Examiner* — Vincent Rudolph
*Assistant Examiner* — Pinalben Patel
(74) *Attorney, Agent, or Firm* — GE Global Patent Operation; Marc A. Vivenzio

(57) ABSTRACT

A method for reducing grid line artifacts in an X-ray image is disclosed, which includes acquiring an X-ray image by scanning an object, wherein the X-ray image comprises grid line artifacts; decomposing the X-ray image into a high frequency image and a low frequency image, wherein the high frequency image comprises the grid line artifacts; filtering the high frequency image to reduce the grid line artifacts in the high frequency image so as to obtain a filtered high frequency image; and combining the filtered high frequency image with the low frequency image to reconstruct an output image. A system adopting the above method is also disclosed.

16 Claims, 15 Drawing Sheets

(51) Int. Cl.
*G06T 5/50* (2006.01)
*G06K 9/62* (2006.01)
*G06T 5/10* (2006.01)
*G06T 11/60* (2006.01)
*G06T 7/13* (2017.01)

(52) U.S. Cl.
CPC ............... G06T 5/50 (2013.01); G06T 7/13 (2017.01); G06T 11/60 (2013.01); *G06T 2207/10116* (2013.01); *G06T 2207/20221* (2013.01); *G06T 2207/20224* (2013.01)

(58) Field of Classification Search
CPC ... G06T 5/10; G06T 5/50; G06T 2207/10116; G06T 2207/20221; G06K 9/6212
See application file for complete search history.

(56) References Cited

U.S. PATENT DOCUMENTS

| | | | |
|---|---|---|---|
| 7,050,618 B2 | 5/2006 | Belykh et al. | |
| 7,474,774 B2 | 1/2009 | Inoue | |
| 8,615,121 B2* | 12/2013 | Pack | G06T 11/006 382/131 |
| 2001/0033638 A1 | 10/2001 | Inoue | |
| 2003/0152259 A1* | 8/2003 | Belykh | G06T 5/10 382/132 |
| 2010/0128147 A1* | 5/2010 | Chang | G06T 5/002 348/241 |
| 2012/0147226 A1* | 6/2012 | Takatori | H04N 5/367 348/246 |
| 2012/0262584 A1* | 10/2012 | Strandemar | G06T 5/50 348/164 |
| 2014/0048713 A1* | 2/2014 | Liu | G21K 1/025 250/366 |
| 2014/0307978 A1* | 10/2014 | Balestrieri | G06T 3/00 382/263 |
| 2015/0078676 A1* | 3/2015 | Arai | G06T 5/20 382/260 |
| 2015/0139392 A1 | 5/2015 | Maack | |
| 2015/0139566 A1* | 5/2015 | Nakamura | G06T 5/002 382/264 |
| 2015/0348288 A1* | 12/2015 | Hagiwara | G06T 11/003 382/131 |
| 2016/0307302 A1* | 10/2016 | Chou | H04N 19/117 |
| 2017/0178303 A1* | 6/2017 | Yan | A61B 6/00 |
| 2017/0294001 A1* | 10/2017 | Zhang | G06T 5/005 |
| 2017/0301095 A1* | 10/2017 | Zhang | G06T 7/11 |

FOREIGN PATENT DOCUMENTS

| | | |
|---|---|---|
| EP | 0 723 762 A2 | 7/1996 |
| EP | 2 120 040 A1 | 11/2009 |
| JP | 5059521 B2 | 10/2012 |
| JP | 2014-050737 A | 3/2014 |
| WO | 2009/157217 A1 | 12/2009 |

OTHER PUBLICATIONS

Combined Search and Examination Report issued in connection with corresponding GB Application No. 1703538.7 dated Aug. 16, 2017.

* cited by examiner

METHOD AND SYSTEM FOR REDUCING GRID LINE ARTIFACTS IN X-RAY IMAGE

CROSS-REFERENCE TO RELATED APPLICATIONS

This application claims priority to CN patent application number 201610153082.2, filed on Mar. 17, 2016, the entirety of which is incorporated herein by reference.

BACKGROUND

This disclosure relates generally to an image processing technique, and more particularly to a method and a system for reducing grid line artifacts in an X-ray image.

In conventional X-ray imaging systems, an X-ray radiated from an X-ray source penetrates an object to be imaged and primary beams of the X-ray reach a digital image detector to form a projected image in digital radiography imaging. However, scattered beams, which are produced when the primary beams pass through the object, may reduce the image contrast and degrade the image quality. In order to remove the undesired scattered beams, an anti-scatter grid array disposed between the X-ray source and the image detector is commonly used. A conventional anti-scatter grid array is typically composed of alternating strips, which are made of an X-ray transmitting material, such as aluminum or carbon, and an X-ray absorbing material, such as lead. The anti-scatter grid array preferentially transmits the primary beams and absorbs the scattered beams. However, due to the grid pattern of the X-ray absorbing material, the anti-scatter grid array casts shadows on the image detector and thus forms visible artifacts, known as grid line artifacts, in the X-ray image.

Therefore, it would be desirable to remove or reduce the grid line artifacts from the X-ray image so as to improve the image quality.

BRIEF DESCRIPTION

In one embodiment, the present disclosure provides a method for reducing grid line artifacts in an X-ray image. The method comprises: acquiring an X-ray image by scanning an object, wherein the X-ray image comprises grid line artifacts; decomposing the X-ray image into a high frequency image and a low frequency image, wherein the high frequency image comprises the grid line artifacts; filtering the high frequency image to reduce the grid line artifacts in the high frequency image so as to obtain a filtered high frequency image; and combining the filtered high frequency image with the low frequency image to reconstruct an output image.

In another embodiment, the present disclosure provides a system for reducing grid line artifacts in an X-ray image. The system comprises an image acquisition device, and a processor comprising an image decomposition module, a filter module and an image reconstruction module. The image acquisition device is configured to scan an object to acquire an X-ray image which comprises grid line artifacts. The image decomposition module is configured to decompose the X-ray image into a high frequency image and a low frequency image. The high frequency image comprises the grid line artifacts. The filter module is configured to filter the high frequency image to reduce the grid line artifacts in the high frequency image so as to obtain a filtered high frequency image. The image reconstruction module is configured to combine the filtered high frequency image with the low frequency image to reconstruct an output image.

DRAWINGS

These and other features, aspects, and advantages of the present disclosure will become better understood when the following detailed description is read with reference to the accompanying drawings in which like characters represent like parts throughout the drawings, wherein.

DETAILED DESCRIPTION

Embodiments of the present disclosure will be described herein below with reference to the accompanying drawings. In the following description, well-known functions or constructions are not described in detail to avoid obscuring the disclosure in unnecessary detail.

Unless defined otherwise, technical and scientific terms used herein have the same meaning as is commonly understood by one of ordinary skill in the art to which this disclosure belongs. The terms "first", "second", "third" and the like, as used herein do not denote any order, quantity, or importance, but rather are used to distinguish one element from another. Also, the terms "a" and "an" do not denote a limitation of quantity, but rather denote the presence of at least one of the referenced items. The term "or" is meant to be inclusive and mean either or all of the listed items. The use of "including," "comprising" or "having" and variations thereof herein are meant to encompass the items listed thereafter and equivalents thereof as well as additional items. In addition, the terms "connected" and "coupled" are not restricted to physical or mechanical connections or couplings, and can include electrical connections or couplings, whether direct or indirect.

Figure 1:
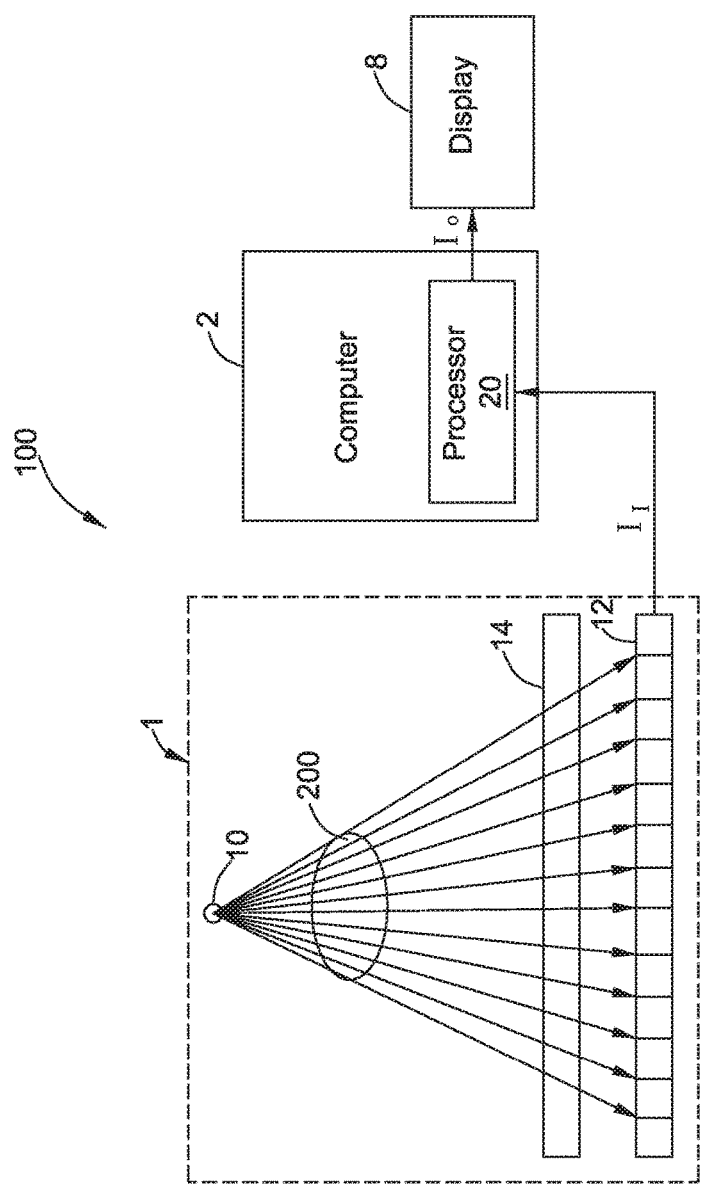
FIG. 1 is a schematic block diagram of an exemplary system for reducing grid line artifacts in an X-ray image in accordance with an embodiment of the present disclosure.
Figure 6:
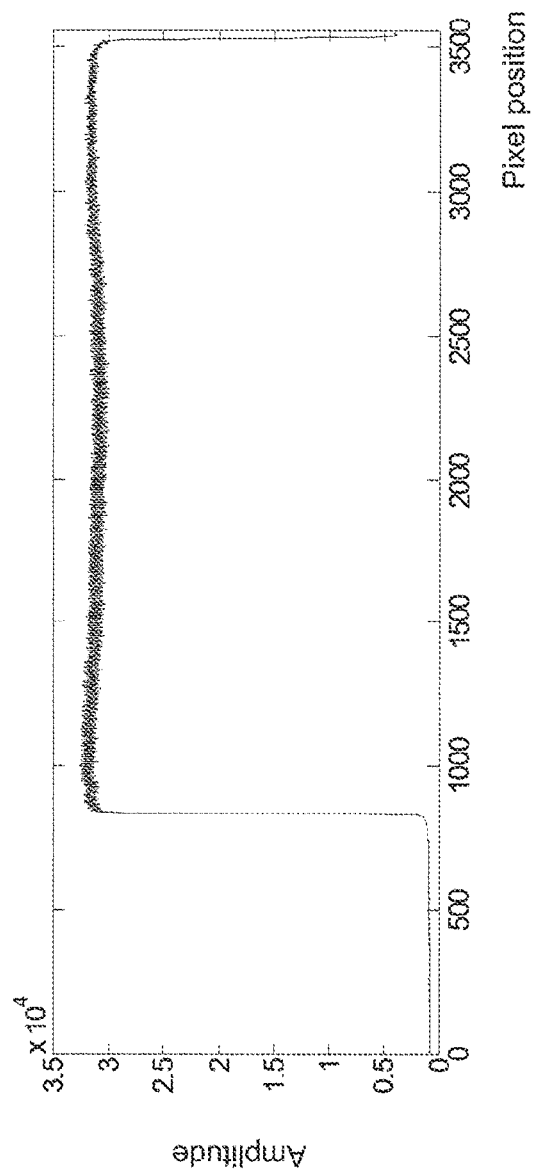
FIG. 6 illustrates an X-ray image comprising grid line artifacts.

FIG. 1 illustrates a schematic block diagram of an exemplary system 100 for reducing grid line artifacts in an X-ray image in accordance with one embodiment of the present disclosure. As shown in FIG. 1, the exemplary system 100 may include an image acquisition device 1 and a computer 2 having a processor 20. The image acquisition device 1 may scan an object 200, such as patient's head, to acquire an X-ray image $I_I$. In one embodiment, the image acquisition device 1 may include an X-ray source 10 and a detector array 12. X-rays radiated from the X-ray source 10 pass through the object 200 to impinge upon the detector array 12 so as to produce the X-ray image $I_I$. The X-ray image $I_I$ has grid line artifacts. For example, the grid line artifacts may be caused by an anti-scatter grid array 14 disposed between the object 200 and the detector array 12. FIG. 6 illustrates the X-ray image $I_I$ comprising the grid line artifacts. The processor 20 may process the X-ray image $I_I$ to reduce or eliminate the grid line artifacts in the X-ray image $I_I$ so as to generate an output image $I_o$. The system 100 may further include a display 8. The output image $I_o$ may be displayed on the display 8 for allowing an operator to observe.

Figure 2:
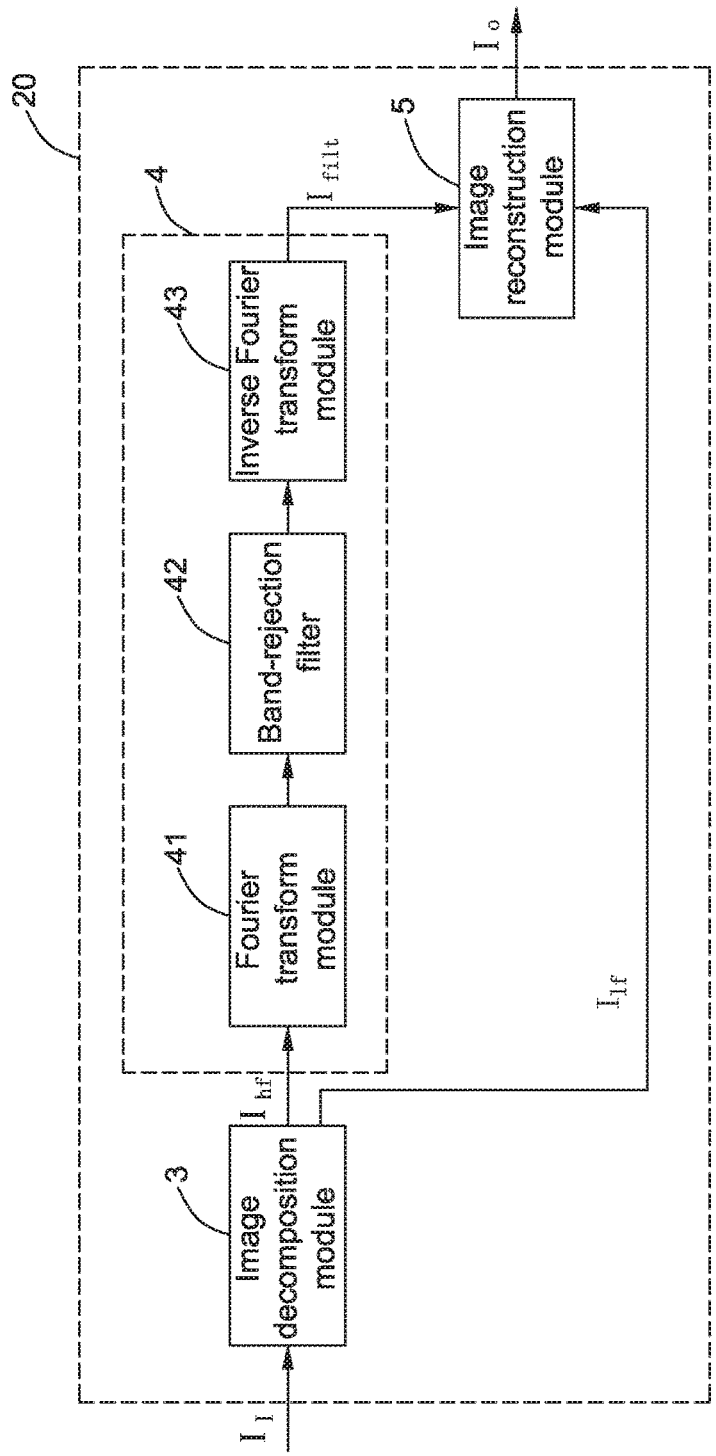
FIG. 2 is a schematic block diagram of one embodiment of modules executing in a processor of a computer of FIG. 1.
Figure 7:
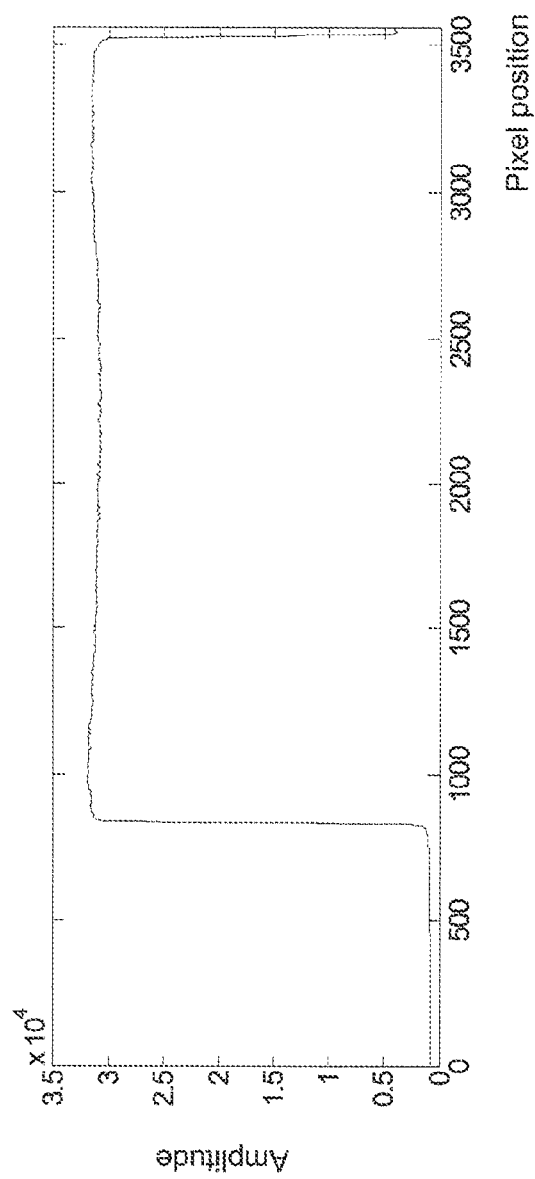
FIG. 7 illustrates a low frequency image decomposed from the X-ray image of FIG. 6.
Figure 8:
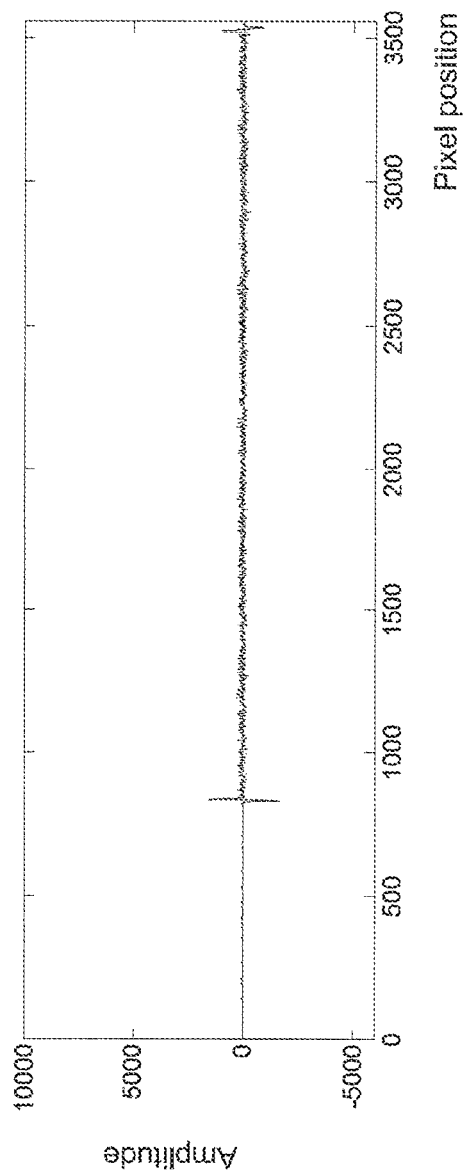
FIG. 8 illustrates a high frequency image decomposed from the X-ray image of FIG. 6.

FIG. 2 illustrates a schematic block diagram of one embodiment of modules executing in the processor 20. It should be noted that the executed modules in the processor 20, which are mentioned hereinafter, may be virtual modules and they may be not necessarily implemented in the real system 100. As shown in FIG. 2, the processor 20 may include an image decomposition module 3, a filter module 4 and an image reconstruction module 5. The image decomposition module 3 may be coupled with the image acquisition device 1. The image decomposition module 3 may receive the X-ray image $I_I$ output from the image acquisition device 1 and may decompose the X-ray image $I_I$ into a high frequency image $I_{hf}$ and a low frequency image $I_{lf}$. The high frequency image $I_{hf}$ may include the grid line artifacts. FIG. 7 and FIG. 8 respectively illustrate the low frequency image $I_{lf}$ and the high frequency image $I_{hf}$ comprising the grid line artifacts.

Frequency selection of the high frequency image $I_{hf}$ and the low frequency image $I_{lf}$ may be relative to the frequency of the grid line artifacts and the image pixel size. For example, for the grid line artifacts of 70 lp/cm and the image pixel size of 100 μm, less than 25 lp/cm may be selected as the low frequency and larger than 25 lp/cm may be selected as the high frequency.

Figure 4:
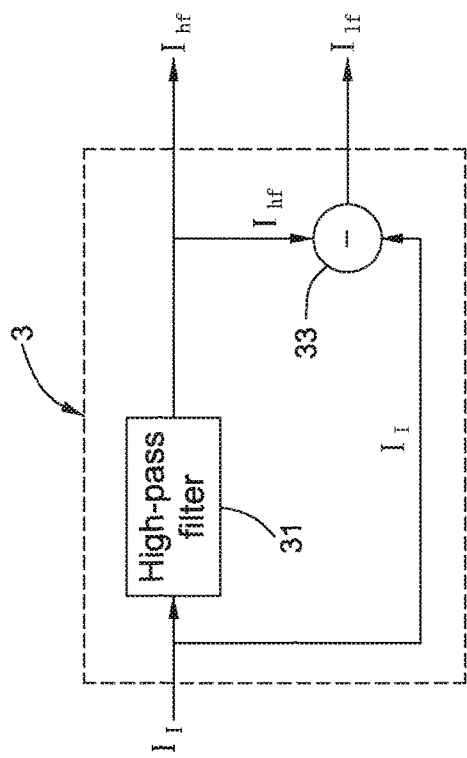
FIG. 4 is a schematic diagram of an image decomposition module of one embodiment of FIGS. 2 and 3.

With reference to FIG. 4, in one embodiment, the image decomposition module 3 may include a high-pass filter 31 and a subtractor 33. The high-pass filter 31 may receive the X-ray image $I_I$ from the image acquisition device 1, and filter the X-ray image $I_I$ so as to obtain the high frequency image $I_{hf}$. The subtractor 33 may receive the X-ray image $I_I$ from the image acquisition device 1 and the high frequency image $I_{hf}$ output from the high-pass filter 31, and subtract the high frequency image $I_{hf}$ from the X-ray image $I_I$ so as to output the low frequency image $I_{lf}$. Thus, the X-ray image $I_I$ may be decomposed into the high frequency image $I_{hf}$ and the low frequency image $I_{lf}$ by the image decomposition module 3 comprising the high-pass filter 31.

Figure 5:
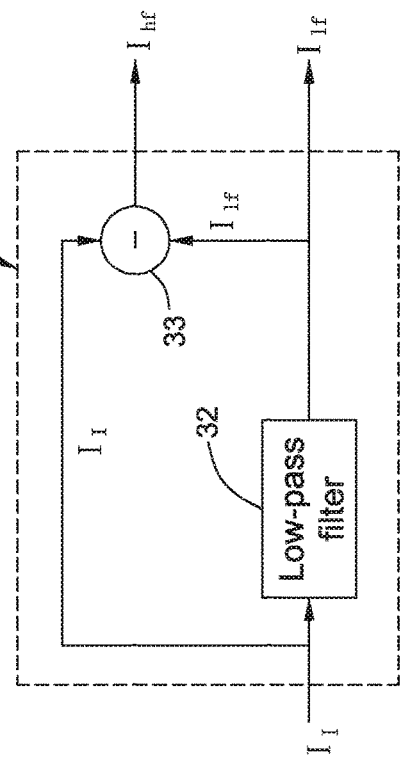
FIG. 5 is a schematic diagram of an image decomposition module of another embodiment of FIGS. 2 and 3.

With reference to FIG. 5, in another embodiment, the image decomposition module 3 may include a low-pass filter 32 and a subtractor 33. The low-pass filter 32 may receive the X-ray image $I_I$ from the image acquisition device 1, and filter the X-ray image $I_I$ so as to obtain the low frequency image $I_{lf}$. The subtractor 33 may receive the X-ray image $I_I$ from the image acquisition device 1 and the low frequency image $I_{lf}$ output from the low-pass filter 32, and subtract the low frequency image $I_{lf}$ from the X-ray image $I_I$ so as to output the high frequency image $I_{hf}$. Thus, the X-ray image $I_I$ may be also decomposed into the high frequency image $I_{hf}$ and the low frequency image $I_{lf}$ by the image decomposition module 3 comprising the low-pass filter 32.

With continued reference to FIG. 2, the filter module 4 may filter the high frequency image $I_{hf}$ to reduce the grid line artifacts in the high frequency image $I_{hf}$ so as to obtain a filtered high frequency image $I_{filt}$. The filter module 4 may include a Fourier transform module 41, a band-rejection filter 42 and an inverse Fourier transform module 43. The band-rejection filter 42 may be coupled between the Fourier transform module 41 and the inverse Fourier transform module 43. The Fourier transform module 41 may perform a Fourier transform to the high frequency image comprising the grid line artifacts and convert the high frequency image comprising the grid line artifacts in a spatial domain to a frequency domain so as to obtain a frequency spectrum. A central frequency and a band width of the band-rejection filter 42 may be determined according to a frequency peak and the distribution of the grid line artifacts in the frequency spectrum. Then, the band-rejection filter 42 having the determined central frequency and the determined band width may be applied to the high frequency image comprising the grid line artifacts in the frequency domain so as to suppress a frequency range of the grid line artifacts. Thus, the grid line artifacts may be reduced or even eliminated from the high frequency image in the frequency domain so as to obtain a filtered high frequency image in the frequency domain. Finally, the inverse Fourier transform module 43 may perform an inverse Fourier transform to the filtered high frequency image in the frequency domain and convert the filtered high frequency image in the frequency domain back to the spatial domain.

The image reconstruction module 5 may receive the filtered high frequency image $I_{filt}$ by the filter module 4 and the low frequency image $I_{lf}$ from the image decomposition module 2, and combine the filtered high frequency image $I_{filt}$ with the low frequency image $I_{lf}$ so as to reconstruct the output image $I_o$.

Figure 3:
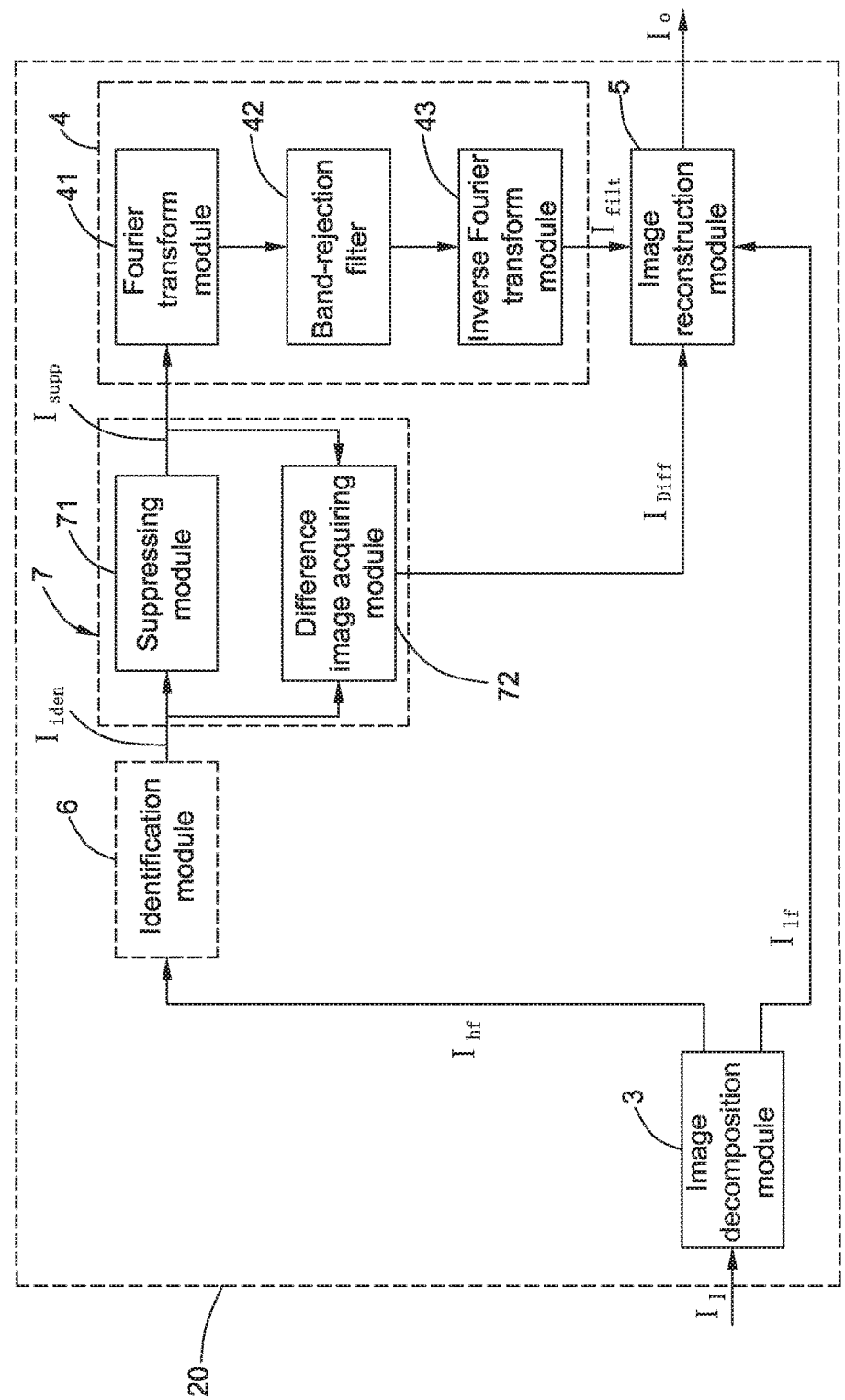
FIG. 3 is a schematic block diagram of another embodiment of modules executing in the processor of the computer of FIG. 1.
Figure 9:
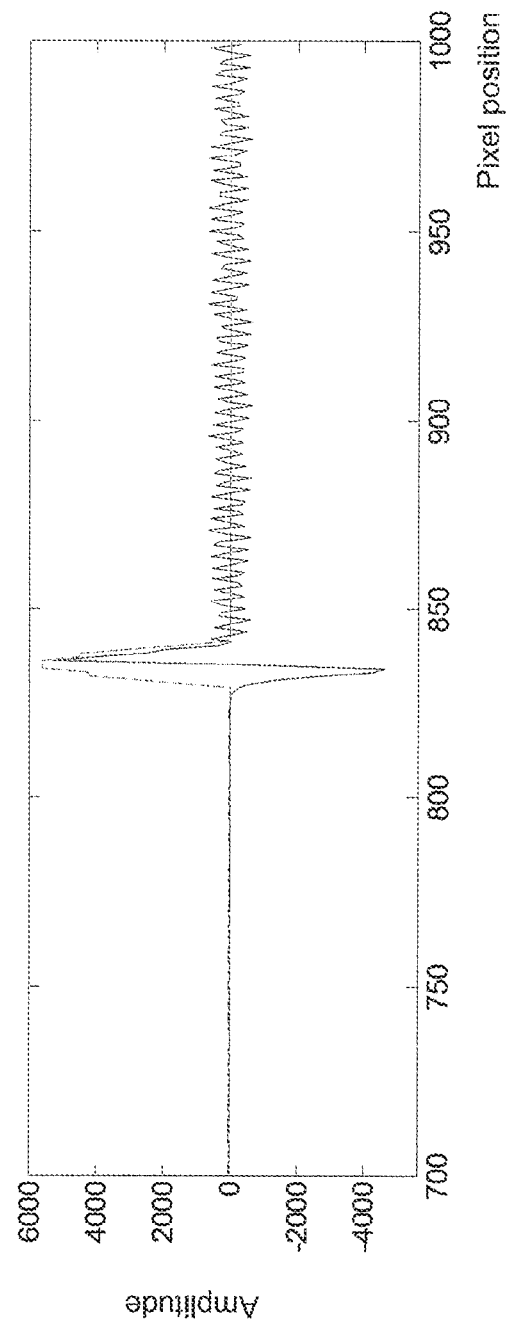
FIG. 9 illustrates a high frequency image with identified strong edge.

FIG. 3 illustrates a schematic block diagram of another embodiment of modules executing in the processor 20. As shown in FIG. 3, besides the modules of FIG. 2, the processor 20 may further include an identification module 6 and a separation module 7. The identification module 6 may identify a strong edge such as bone (for example, a skull boundary) or metal in the high frequency image $I_{hf}$ of FIG. 8. FIG. 9 illustrates the high frequency image with identified strong edge, $I_{iden}$. The strong edge used herein can be defined as a set of contiguous pixel positions where an abrupt change of intensity (gray or color) values occurs. Usually, the edge can be linked to a gradient, and the strong edge means high gradient areas.

As an example, the identification module 6 may compare amplitudes of individual pixels in the high frequency image $I_{hf}$ with a predetermined amplitude threshold, and select regions of pixels whose amplitudes are higher than the predetermined amplitude threshold as the strong edge.

In addition, considering the impact of malfunctional detector cells of the detector array 12 on the X-ray image $I_I$, the identification module 6 may further determine whether the regions of pixels higher than the predetermined amplitude threshold are continuous, and regard continuous regions of pixels as the strong edge.

After the strong edge is identified by the identification module 6, the separation module 7 may separate information of the strong edge from the high frequency image and may thus obtain a separated high frequency image. Under such circumstances, the filter module 4 may filter the separated high frequency image so as to reduce the grid line artifacts, and the image reconstruction module 5 may further recover the information of the strong edge in the filtered high frequency image $I_{filt}$.

Figure 10:
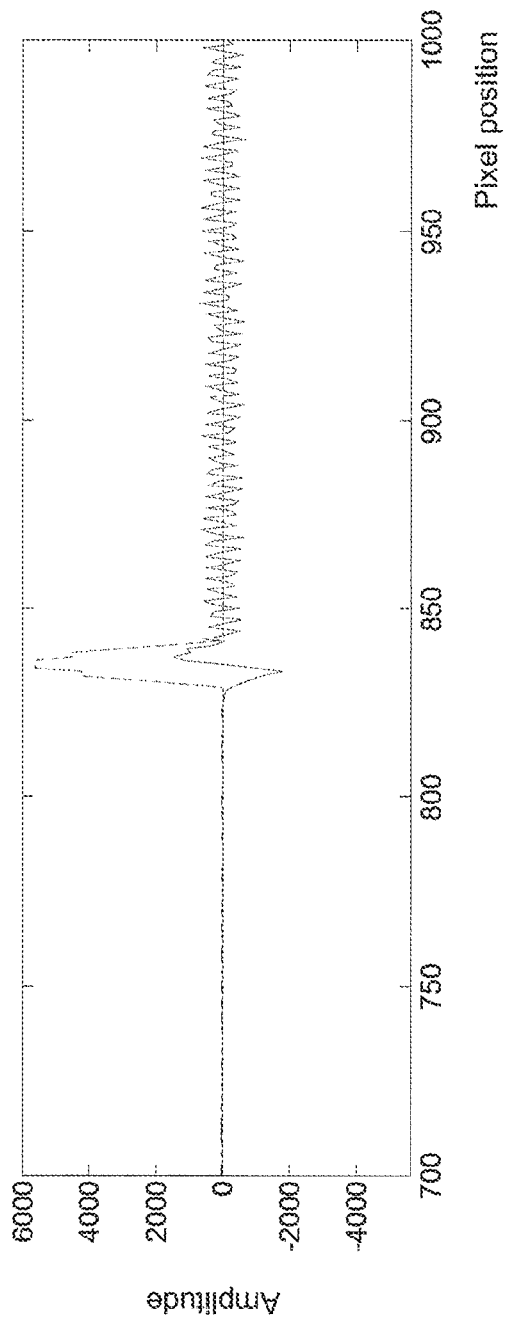
FIG. 10 illustrates a suppressed high frequency image, in which the strong edge is suppressed.
Figure 11:
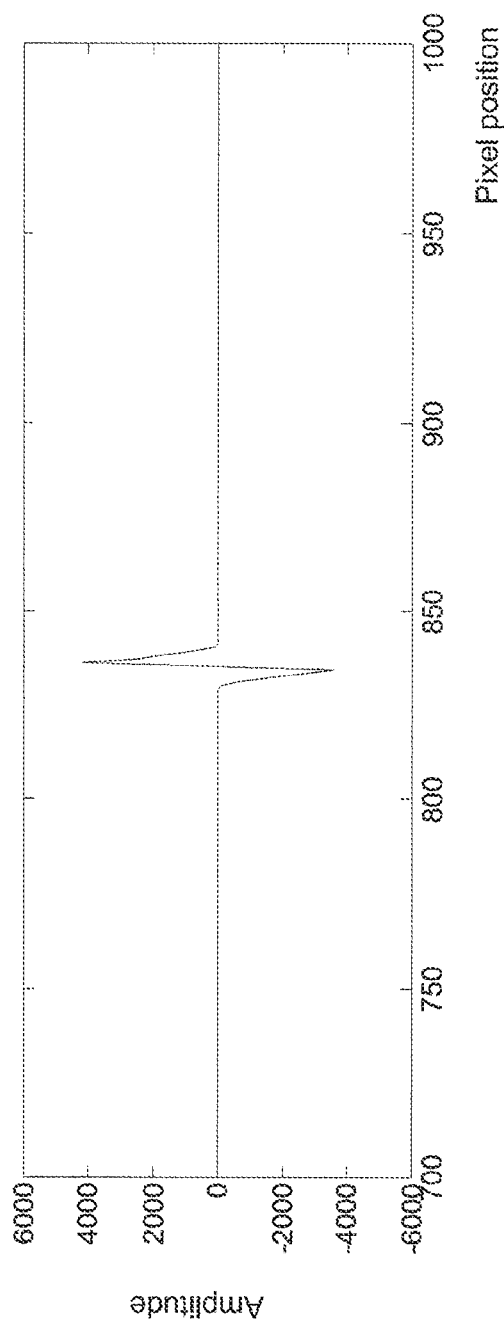
FIG. 11 illustrates a image difference between the high frequency image with the identified strong edge in FIG. 9 and the suppressed high frequency image in FIG. 10.

The separation module 7 may include a suppression module 71 and a difference image acquiring module 72. The suppression module 71 may suppress the strong edge to a lower amplitude to obtain a suppressed high frequency image $I_{supp}$ (as shown in FIG. 10). A suppressed gain of the suppression module 71 may be larger than 0.9. For example, the suppressed gain may be 0.95. The purpose of suppressed process is to separate the information of the strong edge from the high frequency image to obtain a separated high frequency image and reduce the influence of the strong edge in a subsequent filtering process of the high frequency image. The difference image acquiring module 72 may receive the high frequency image with the identified strong edge, $I_{iden}$ of FIG. 9 and the suppressed high frequency image $I_{supp}$ of FIG. 10, and obtain and store an image difference $I_{Diff}$ (as shown in FIG. 11) between the high frequency image with the identified strong edge $I_{iden}$ of FIG. 9 and the suppressed high frequency image $I_{supp}$ of FIG. 10. The image difference $I_{Diff}$ of FIG. 11 may be indicative of the information of the strong edge.

Figure 12:
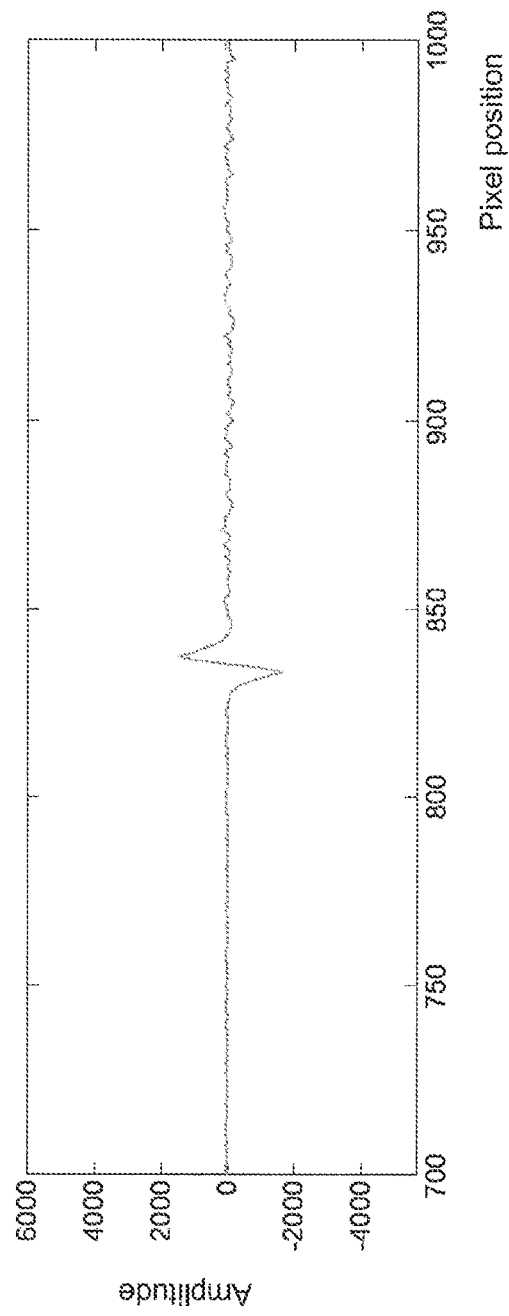
FIG. 12 illustrates a filtered high frequency image from FIG. 10.
Figure 13:
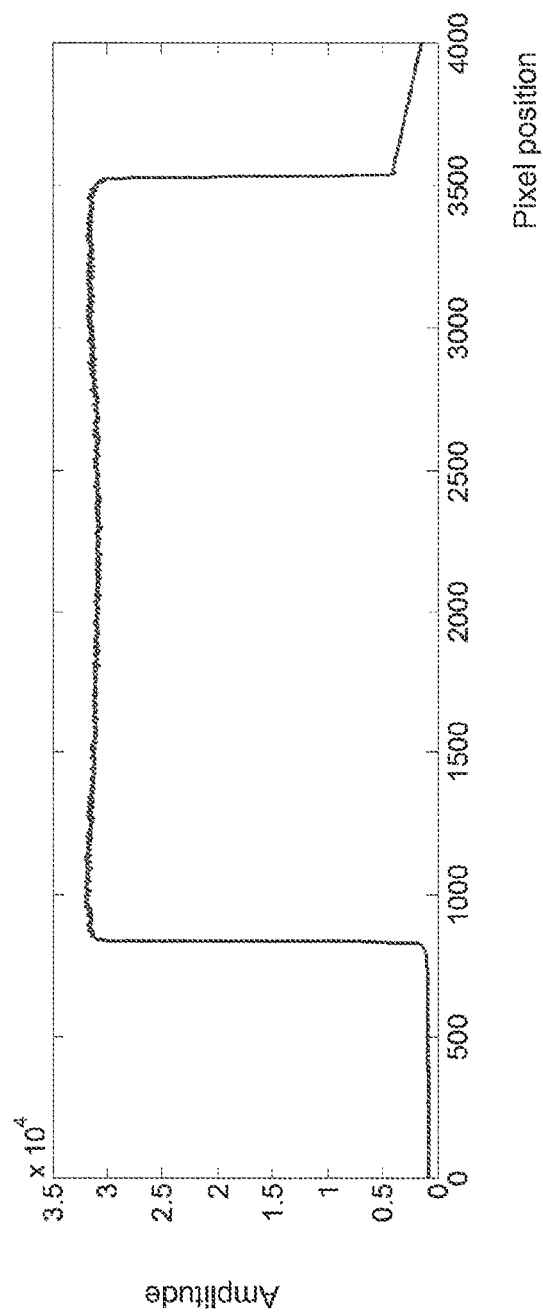
FIG. 13 illustrates an output image combining the low frequency image in FIG. 7, the image difference in FIG. 11 and the filtered high frequency image in FIG. 12.

Therefore, the filter module 4 may filter the suppressed high frequency image $I_{supp}$ of FIG. 10 so as to obtain a filtered high frequency image $I_{filt}$ (as shown in FIG. 12). The image reconstruction module 5 may receive the low frequency image $I_{lf}$ of FIG. 7 from the image decomposition module 2, the stored image difference $I_{Diff}$ of FIG. 11 from the difference image acquiring module 72 and the filtered high frequency image $I_{filt}$ of FIG. 12 from the filter module 4, and combine the low frequency image $I_{lf}$ of FIG. 7, the image difference $I_{Diff}$ of FIG. 11 and the filtered high frequency image $I_{filt}$ of FIG. 12 so as to reconstruct the output image $I_o$ (as shown in FIG. 13). During the image reconstruction, the image reconstruction module 5 may further add the stored image difference $I_{Diff}$ to the filtered high frequency image $I_{filt}$. Thus, the information of the strong edge may be recovered in the filtered high frequency image $I_{filt}$ which may help to enhance detectability of the system 100 and diagnostics capability.

The system 100 may effectively reduce the grid line artifacts in the output image $I_o$ and may avoid other ringing artifacts caused near strong edge due to the intensity non-continuity. Thus, the system 100 may improve detectability of the output image $I_o$ and accuracy of clinical diagnosis.

Figure 14:
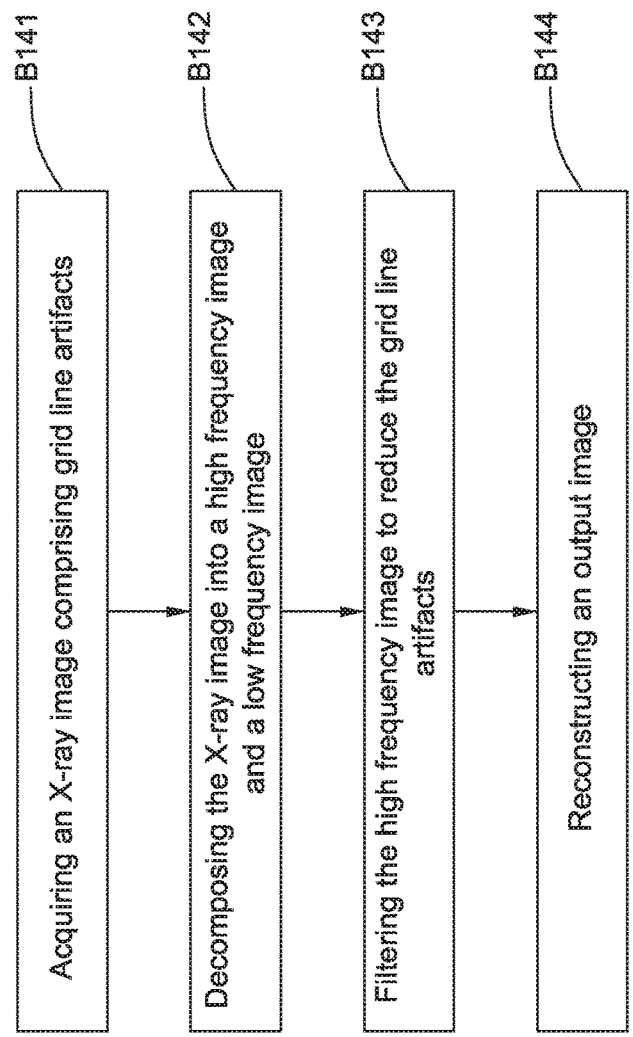
FIG. 14 is a flow chart of an exemplary method for reducing grid line artifacts in an X-ray image in accordance with an embodiment of the present disclosure.

The present disclosure may further provide a method for reducing grid line artifacts in an X-ray image. FIG. 14 illustrates a flow chart of an exemplary method for reducing grid line artifacts in an X-ray image in accordance with an embodiment of the present disclosure.

In block B141 of FIG. 14, an X-ray image $I_I$ comprising grid line artifacts (as shown in FIG. 6) may be acquired by scanning an object 200. In one embodiment, the X-ray image $I_I$ may be produced by X-rays radiated from an X-ray source 10 passing through the object 200 to impinge upon a detector array 12. The grid line artifacts may be caused, for example, by an anti-scatter grid array 14 disposed between the object 200 and the detector array 12.

In block B142, the X-ray image $I_I$ may be decomposed into a high frequency image $I_{hf}$ (as shown in FIG. 8) and a low frequency image $I_{lf}$ (as shown in FIG. 7). The high frequency image $I_{hf}$ of FIG. 8 may include the grid line artifacts. In one embodiment, the high frequency image $I_{hf}$ may be first obtained by applying a high-pass filter 31 to the X-ray image $I_I$, and the low frequency image $I_{lf}$ may be then obtained by subtracting the high frequency image $I_{hf}$ from the X-ray image $I_I$. In another embodiment, the low frequency image $I_{lf}$ may be first obtained by using a low-pass filter 32 to the X-ray image $I_I$, and the high frequency image $I_{hf}$ may be then obtained by subtracting the low frequency image $I_{lf}$ from the X-ray image $I_I$.

In block B143, the high frequency image $I_{hf}$ comprising the grid line artifacts may be filtered to reduce the grid line artifacts so as to obtain a filtered high frequency image $I_{filt}$ (as shown in FIG. 12). In one implementation, a Fourier transform may be firstly performed to convert the high frequency image in a spatial domain to a frequency domain. Then, the high frequency image in the frequency domain may be filtered by using a band-rejection filter 42 so as to reduce the grid line artifacts. An inverse Fourier transform may be finally performed to convert a filtered high frequency image in the frequency domain back to the spatial domain.

In one embodiment, in order to reduce influence of a strong edge in the filtering process of the high frequency image $I_{hf}$, filtering the high frequency image in block B143 may further include: identifying a strong edge in the high frequency image $I_{hf}$, separating information of the strong edge from the high frequency image, and filtering the separated high frequency image to reduce the grid line artifacts.

Hereinafter, how to identify the strong edge in the high frequency image $I_{hf}$ of FIG. 8 will be described in detail with reference to FIG. 15.

In block B151, amplitudes of individual pixels in the high frequency image $I_{hf}$ may be compared with a predetermined amplitude threshold.

In block B152, regions of pixels whose amplitudes are higher than the predetermined amplitude threshold may be selected. The regions of pixels higher than the predetermined amplitude threshold may be regarded as the strong edge.

In an optional embodiment, the step of identifying the strong edge may further include an optional block B153 after block B152 in order to exclude the impact of malfunctional detector cells on the X-ray image $I_I$. In the optional block B153, it may be determined whether the regions of pixels higher than the predetermined amplitude threshold are continuous. If yes, the process may go to block B154.

In block B154, continuous regions of pixels may be selected, and the continuous regions of pixels may be regarded as the strong edge.

After the strong edge is identified in the high frequency image, it is necessary to separate information of strong edge from the high frequency image. Hereinafter, how to separate information of strong edge from the high frequency image will be described in detail with reference to FIG. 16.

In block B161, the high frequency image with identified strong edge, $I_{iden}$ of FIG. 9 may be obtained for example with reference to block B151-block B154.

In block B162, the identified strong edge may be suppressed to a lower amplitude to obtain a suppressed high frequency image $I_{supp}$ (as shown in FIG. 10).

In block B163, an image difference $I_{Diff}$ (as shown in FIG. 11) may be obtained and stored between the high frequency image with the identified strong edge, $I_{iden}$ of FIG. 9 and the suppressed high frequency image $I_{supp}$ of FIG. 10. The image difference $I_{Diff}$ of FIG. 11 may be indicative of the information of the strong edge.

Thus, the step of filtering the separated high frequency image may include: filtering the suppressed high frequency image $I_{supp}$ of FIG. 10 so as to obtain the filtered high frequency image $I_{filt}$ of FIG. 12.

Returning to FIG. 14, in block B144, the filtered high frequency image $I_{filt}$ of FIG. 12 may be combined with the low frequency image $I_{lf}$ of FIG. 7 to reconstruct an output image $I_o$ (as shown in FIG. 13). In the embodiment including separating the information of the strong edge, the step of reconstructing the output image $I_o$ in block B144 may further include: recovering the information of the strong edge in the filtered high frequency image $I_{filt}$ by adding the stored image difference $I_{Diff}$ of FIG. 11 in block B163 to the filtered high frequency image $I_{filt}$ of FIG. 12.

The method may effectively reduce the grid line artifacts in the output image $I_o$ and may avoid other ringing artifacts caused near strong edge due to the intensity non-continuity. Thus, the method may improve detectability of the output image $I_o$ and accuracy of clinical diagnosis.

Figure 15:
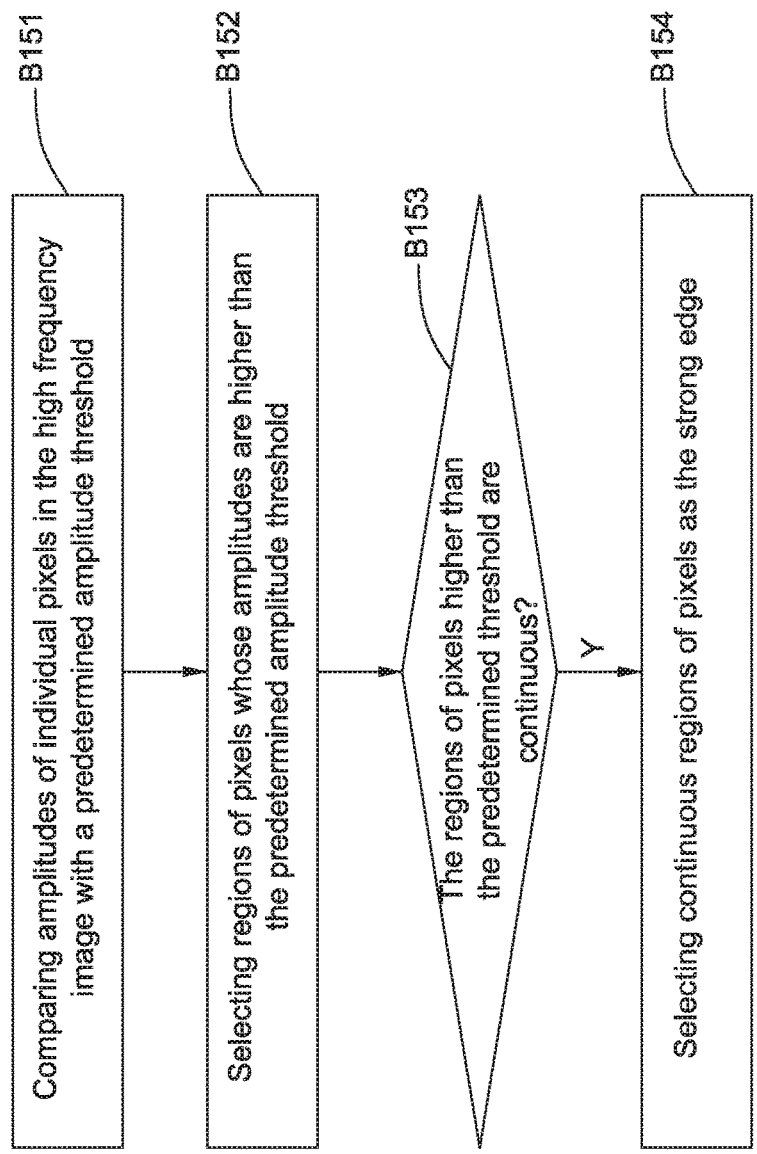
FIG. 15 illustrates steps how to identify strong edge in the high frequency image of FIG. 8.
Figure 16:
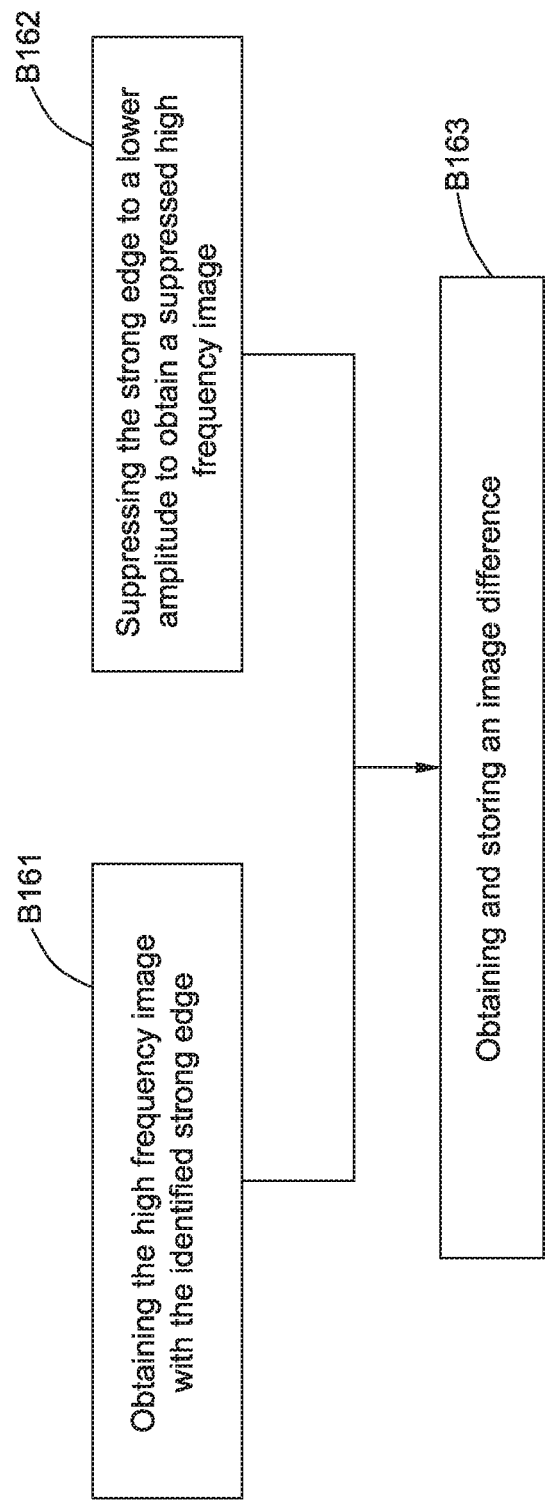
FIG. 16 illustrates steps how to separate information of strong edge from the high frequency image of FIG. 8.

While steps of the methods for reducing the grid line artifacts in the X-ray image in accordance with embodiments of the present disclosure are illustrated as functional blocks, the order of the blocks and the separation of the steps among the various blocks shown in FIGS. 14-16 are not intended to be limiting. For example, the blocks may be performed in a different order and a step associated with one block may be combined with one or more other blocks or may be sub-divided into a number of blocks.

While the disclosure has been illustrated and described in typical embodiments, it is not intended to be limited to the details shown, since various modifications and substitutions can be made without departing in any way from the spirit of the present disclosure. As such, further modifications and equivalents of the disclosure herein disclosed may occur to persons skilled in the art using no more than routine experimentation, and all such modifications and equivalents are believed to be within the spirit and scope of the disclosure as defined by the following claims.

What is claimed is:

1. A method for reducing grid line artifacts in an X-ray image, comprising:
    acquiring an X-ray image by scanning an object, wherein the X-ray image comprises grid line artifacts;
    decomposing the X-ray image into a high frequency image and a low frequency image, wherein the high frequency image comprises the grid line artifacts;
    filtering the high frequency image to reduce the grid line artifacts in the high frequency image so as to obtain a filtered high frequency image, said filtering comprising:
        identifying a strong edge in the high frequency image;
        separating information of the strong edge from the high frequency image to create a separated high frequency image, said separating comprising suppressing the strong edge to a lower amplitude to obtain a suppressed high frequency image, and obtaining and storing an image difference between the high frequency image with the identified strong edge and the suppressed high frequency image; and
        filtering the separated high frequency image to reduce the grid line artifacts so as to obtain the filtered high frequency image, said filtering comprising filtering the suppressed high frequency image; and
    combining the filtered high frequency image with the low frequency image to reconstruct an output image, said reconstructing comprising recovering the information of the strong edge in the filtered high frequency image.

2. The method of claim 1, wherein decomposing the X-ray image into the high frequency image and the low frequency image comprises:
    applying a high-pass filter to the X-ray image so as to obtain the high frequency image; and
    subtracting the high frequency image from the X-ray image to obtain the low frequency image.

3. The method of claim 1, wherein decomposing the X-ray image into the high frequency image and the low frequency image comprises:
    applying a low-pass filter to the X-ray image so as to obtain the low frequency image; and
    subtracting the low frequency image from the X-ray image to obtain the high frequency image.

4. The method of claim 1, wherein recovering the information of the strong edge in the filtered high frequency image comprises: adding the stored image difference to the filtered high frequency image.

5. The method of claim 1, wherein identifying the strong edge comprises:
    comparing amplitudes of individual pixels in the high frequency image with a predetermined amplitude threshold; and
    regarding regions of pixels whose amplitudes are higher than the predetermined amplitude threshold as the strong edge.

6. The method of claim 5, wherein identifying the strong edge further comprises:
    determining whether the regions of pixels higher than the predetermined amplitude threshold are continuous; and
    regarding continuous regions of pixels as the strong edge.

7. The method of claim 1, wherein filtering the high frequency image to reduce the grid line artifacts comprises:
    performing a Fourier transform to convert the high frequency image in a spatial domain to a frequency domain;
    applying a band-rejection filter to the high frequency image in the frequency domain so as to reduce the grid line artifacts; and
    performing an inverse Fourier transform to convert a filtered high frequency image in the frequency domain back to the spatial domain.

8. A system for reducing grid line artifacts in an X-ray image, comprising:
    an image acquisition device configured to scan an object to acquire an X-ray image which comprises grid line artifacts; and
    a processor comprising:
        an image decomposition module configured to decompose the X-ray image into a high frequency image and a low frequency image, wherein the high frequency image comprises the grid line artifacts;
        a filter module configured to filter the high frequency image to reduce the grid line artifacts in the high frequency image so as to obtain a filtered high frequency image;
        an image reconstruction module configured to combine the filtered high frequency image with the low frequency image to reconstruct an output image;
        an identification module configured to identify a strong edge in the high frequency image; and
        a separation module configured to separate information of the strong edge from the high frequency image to create a separated high frequency image, said separation module comprising a suppression module configured to suppress the strong edge to a lower amplitude to obtain a suppressed high frequency image, and a difference image acquiring module configured to obtain and store an image difference between the high frequency image with the identified strong edge and the suppressed high frequency image, wherein the filter module filters the separated high frequency image to reduce the grid line artifacts so as to obtain the filtered high frequency image, the image reconstruction module is further configured to recover the information of the strong edge in the filtered high frequency image, and filter module filters the suppressed high frequency image to obtain the filtered high frequency image.

9. The system of claim 8, wherein the image decomposition module comprises:
a high-pass filter configured to filter the X-ray image to obtain the high frequency image; and
a subtractor configured to subtract the high frequency image from the X-ray image to obtain the low frequency image.

10. The system of claim 8, wherein the image decomposition module comprises:
a low-pass filter configured to filter the X-ray image to obtain the low frequency image; and
a subtractor configured to subtract the low frequency image from the X-ray image to obtain the high frequency image.

11. The system of claim 8, wherein the image reconstruction module is further configured to add the stored image difference to the filtered high frequency image.

12. The system of claim 8, wherein the identification module is configured to:
compare amplitudes of individual pixels in the high frequency image with a predetermined amplitude threshold; and
regard regions of pixels whose amplitudes are higher than the predetermined amplitude threshold as the strong edge.

13. The system of claim 12, wherein the identification module is further configured to:
determining whether the regions of pixels higher than the predetermined amplitude threshold are continuous; and
regarding continuous regions of pixels as the strong edge.

14. The system of claim 8, wherein the filter module comprises a Fourier transform module, a band-rejection filter and an inverse Fourier transform module, wherein
the Fourier transform module is configured to perform a Fourier transform to convert the high frequency image in a spatial domain to a frequency domain;
the filter module is configured to filter the high frequency image in the frequency domain to reduce the grid line artifacts; and
the inverse Fourier transform module is configured to perform an inverse Fourier transform to convert a filtered high frequency image in the frequency domain back to the spatial domain.

15. The method of claim 1, further comprising displaying the output image on a display.

16. The system of claim 8, further comprising a display to display the output image.

* * * * *